United States Patent [19]

Ito et al.

[11] Patent Number: 4,955,258
[45] Date of Patent: Sep. 11, 1990

[54] DEVICE AND METHOD OF FAIL-SAFE CONTROL FOR ELECTRONICALLY CONTROLLED AUTOMATIC TRANSMISSION

[75] Inventors: Yasunobu Ito; Kenji Suzuki, both of Aichi, Japan

[73] Assignee: Aisin AW Kabushiki Kaisha, Japan

[21] Appl. No.: 280,935

[22] Filed: Dec. 7, 1988

[30] Foreign Application Priority Data

Dec. 28, 1987 [JP] Japan ................................ 62-329507

[51] Int. Cl.⁵ ............................................. B60K 41/06
[52] U.S. Cl. ........................................ 74/866; 74/878; 364/424.1
[58] Field of Search ................. 74/866, 878; 364/424.1

[56] References Cited

U.S. PATENT DOCUMENTS

| | | | |
|---|---|---|---|
| 4,208,929 | 6/1980 | Heino | 74/731 |
| 4,361,060 | 11/1982 | Smyth | 74/866 |
| 4,527,678 | 7/1985 | Pierce et al. | 74/866 X |
| 4,569,255 | 2/1986 | Holmes | 74/866 |
| 4,576,065 | 3/1986 | Speranza et al. | 74/866 |
| 4,611,285 | 9/1986 | Weisman, II | 74/866 X |
| 4,660,440 | 4/1987 | Matsumura et al. | 74/866 |
| 4,671,138 | 6/1987 | Nobumoto et al. | 74/866 X |
| 4,685,051 | 8/1987 | Hattori et al. | 74/866 X |
| 4,685,356 | 8/1987 | Iwatsuki | 74/866 |
| 4,702,127 | 10/1987 | Cote | 74/866 |

*Primary Examiner*—Dwight Diehl
*Attorney, Agent, or Firm*—Lorusso & Loud

[57] ABSTRACT

In a fail-safe control device for an electronically controlled automatic transmission to be mounted on a vehicle, a sensor for the number of revolution input to a T/M is newly provided for the electronically controlled automatic transmission, and an actual gear ratio of the T/M is calculated in accordance with the number of revolution input to the T/M and the number of revolution output from the T/M or the car speed. If the calculated actual gear ratio is coincided with the formal gear ratio, it is determined that the state is normal, while if they are not coincided with each other, it is determined that the T/M is in a failure state. As a result of this, failure detection of the T/M is performed. Therefore, in a case when the T/M is in a failure state, a driver can take a measure, for exmple, by performing an emergency control. Furthermore, the occurrence of the failure can be displayed by a detected failure displaying device so that the driver can take a measure such as a repair.

7 Claims, 3 Drawing Sheets

DEVICE AND METHOD OF FAIL-SAFE CONTROL FOR ELECTRONICALLY CONTROLLED AUTOMATIC TRANSMISSION

BACKGROUND OF THE INVENTION

The present invention relates to a fail-safe control of an electronically controlled automatic transmission to be mounted on a vehicle, and, more particularly, to a fail-safe control against failures in the mechanic portion of a transmission (T/M) such as stick valves or slippages of the friction materials or the like.

In the conventional electronically controlled automatic transmission, the signals corresponding to the degree of throttle and the car speed or the output rotational speed of the T/M are used to judge the gear ratio of the T/M and whether the lock-up clutch is turned on or off to control an actuator such as a solenoid installed in the T/M is controlled.

However, in the above-described type of conventional control method, while there is no problem in fail-safe control against electric failures of the sensors or the actuators, it is difficult to perform a sufficient fail-safe control against failures in the mechanical portions of the T/M, for example, stick valves or the slippages of friction materials. Therefore, a further improvement is required for comfortable driving.

SUMMARY OF THE INVENTION

An object of the present invention is to provide a device and a method of fail-safe control for an electronically controlled automatic transmission in which failures in the mechanical portion of an automatic transmission can be detected accurately and the fact of the failure is accurately communicated to a driver so that a reliable fail-safe control can be provided.

In order to achieve the above-described object, the present invention provides, in a fail-safe control device for an electronically controlled automatic transmission: a sensor for detection of the number of revolutions input to the transmission; a sensor for the number of revolutions output from the transmission or a car speed sensor; means for calculating an actual gear ratio in accordance with the sensed number of input revolutions, and the sensed number of output revolutions or the car speed obtained from the car speed sensor; means for obtaining a formal gear ratio; and means for detecting failures in a mechanical portion of the transmission by making a comparison between the formal gear ratio and the thus-calculated gear ratio are provided.

Furthermore, the invention provides a fail-safe control method for an electronically controlled automatic transmission, including: measuring the number of revolutions input to the transmission from a sensor for the number of revolutions input to the transmission; measuring the number of revolutions output from the transmission from a sensor for the number of revolutions output from the transmission or a car speed sensor; calculating an actual gear ratio in accordance with the number of revolutions input to the transmission and the number of revolutions output from the transmission or the car speed; obtaining a formal gear ratio; comparing the formal gear ratio and the thus-calculated gear ratio; and detecting a failure in the mechanic portion of the transmission if the formal gear ratio and the calculted gear ratio do not coincide.

In automatic transmissions, the formal gear ratio is, in general, defined in accordance with the position of the shift lever and the state of the output from the shift solenoid. Therefore, by making a comparison between this formal gear ratio and the thus-calculated gear ratio, failures in the mechanical portion of the automatic transmission such as a stick shift valve a stick plunger in the shift solenoid, and slippages of the friction materials due to reduction in the hydraulic pressure can be detected. Therefore, the above-described failures in the mechanical portion of the automatic transmission can be properly detected. Furthermore, the failures can be communicated to a driver so that a reliable fail-safe control can be performed.

DESCRIPTION OF THE PREFERRED EMBODIMENT

An embodiment of the present invention will now be described with reference to the drawings.

Figure 1:
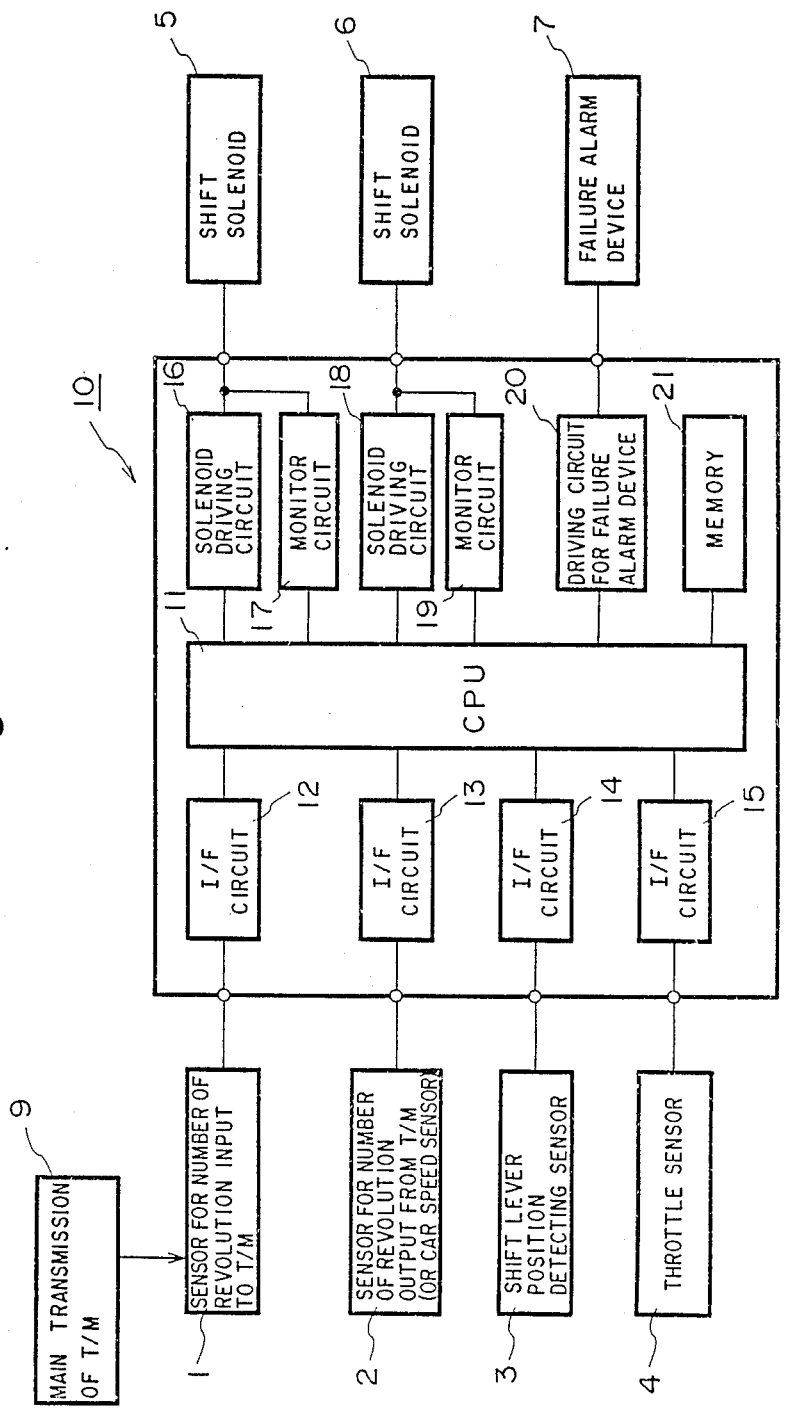
FIG. 1 is an overall structural view of a fail-safe control system in an electronically controlled automatic transmission according to an embodiment of the present invention.

FIG. 1 is an overall structural view of a fail-safe control system in an electronically controlled automatic transmission which shows an embodiment of the present invention.

Referring to the drawing, reference numeral 1 represents a sensor for the number of revolutions input to a T/M. This sensor is mounted on a main transmission 9 of the T/M for the purpose of enabling detection of the number of revolutions of a $C_1$ drum of a transverse engine FF vehicle to be described later (the number of revolutions of a $C_O$ drum in a case of an FR vehicle). Reference numeral 2 represents a sensor for the number of revolutions output from the T/M. Reference numeral 3 represents a shift lever position detecting sensor, 4 represents a throttle sensor, 5 represents a first shift solenoid, 6 represents a second shift solenoid, 7 represents a failure alarm device, 10 represents an electronic control device, 11 represents a central processing unit (CPU), 12 to 15 each represents an interface circuit, 16 represents a driving circuit for the first shift solenoid 5, 17 represents a monitor circuit for the first shift solenoid 5, 18 represents a driving circuit for the second shift solenoid 6, 19 represents a monitor circuit for the second shift solenoid 6, 20 represents a driving circuit for a failure alarm device, and 21 represents a memory.

Although, the above-described sensor 2 for the number of revolutions output from the T/M is a type which can be mounted on the T/M, this sensor 2 for the number of revolutions may be replaced by a so-called car speed sensor included in a speedometer.

In this system, the formal gear ratio is defined in accordance with the position of the shift lever and the state of the output from the shift solenoid.

That is, in accordance with a signal from the shift lever position detecting sensor 3 and the state of the shift solenoid, the formal gear ratio is stored in the memory 21 connected to the CPU 11. Then, an actual gear ratio is calculated from the input signals, output from the sensor 1 and the output signals, output from the sensor 2 for the number of revolution output from and the thus-calculated actual gear ratio and the above-described formal gear ratio are compared in the CPU 11. If the calculated actual gear ratio conincides with the formal gear ratio, it is determined that the state is normal. If they do not coincide with each other, it is determined that the T/M is in a failure state.

As a result, the driver can operate the vehicle in a manual transmission mode in which the gear ratio can be selected by a shift lever, or the driver can perform an emergency mode control in which the maximum hydraulic pressure is used in a case when the hydraulic pressure is electronically controlled.

Furthermore, by turning on a failure alarm device (indicator) 7 disposed in a panel or the like near driver's seat for the purpose of indicating a failure, the occurrence of a failure is communicated to the driver to advise the driver of the necessity of performing repair.

Meanwhile, during the time period immediately after the signal of a transmission shift has been output to the completion of the transmission shift, the gear ratio is continuously changed from the gear ratio before the transmission shift to the next gear ratio. Therefore, in order to prevent erroneous detection, failure detection is prohibited for a predetermined time period (a sufficient time from the completion of the transmission shift to the state where the gear ratio is stabilized, it being 3 to 5 seconds based on experience) from the shift of the shift solenoid.

Next, a T/M for a transverse engine FF vehicle which is provided with the sensor for the number of input to the T/M according to the present invention will be described with reference to FIG. 2.

Figure 2:
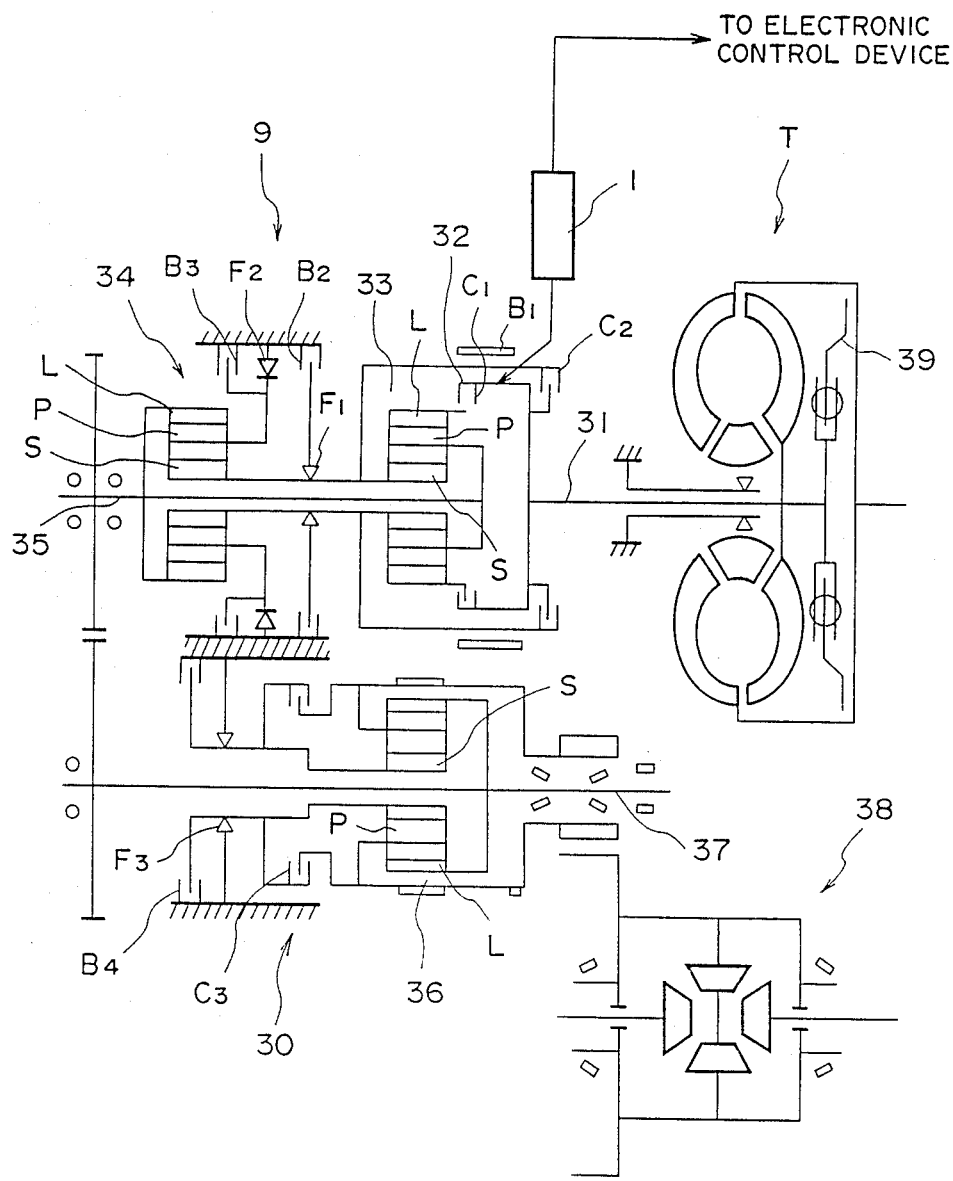
FIG. 2 is a structural view of a T/M for a transverse engine FF vehicle provided with a sensor for the number of input revolutions to a T/M according to the present invention.

Referring to FIG. 2, symbol T represents a torque converter, $C_1$, $C_2$ and $C_3$ each represent a multiple disc clutch, $B_1$ represents a band brake, $B_2$, $B_3$, and $B_4$ each represent a multiple disc brake, and $F_1$, $F_2$ and $F_3$ each represent a one-way brake. Reference numeral 9 represents a main transmission, 30 represents a sub-transmission, 31 represents an input shaft, and 32 represents a $C_1$ drum directly connected to the input shaft 31. The number of revolutions of this $C_1$ drum 32 is detected by the above-described sensor 1 as the number of revolutions input to the T/M. Reference numeral 33 represents a under-drive mechanism $UD_1$, 34 represents a under-drive mechanism $UD_2$, 35 represents an intermediate shaft, 36 represents a under drive mechanism $UD_3$, 37 represents an output shaft, 38 represents a differential mechanism, and 39 represents a lock-up clutch.

As described above, since the sensor 1 for the number of revolutions input to the T/M detects the number of revolutions of the $C_1$ drum 32 which is directly connected to the input shaft 31 for transmitting the number of revolutions output from the torque converter T, an accurate input number of revolutions can be obtained. Furthermore, since the sensor 1 for the number of revolutions input to the T/M can be collectively located at a position near the electronic control device mounted in a front portion of the vehicle, an advantage in case of maintenance can be realized and improved reliability can be obtained.

Figure 3:
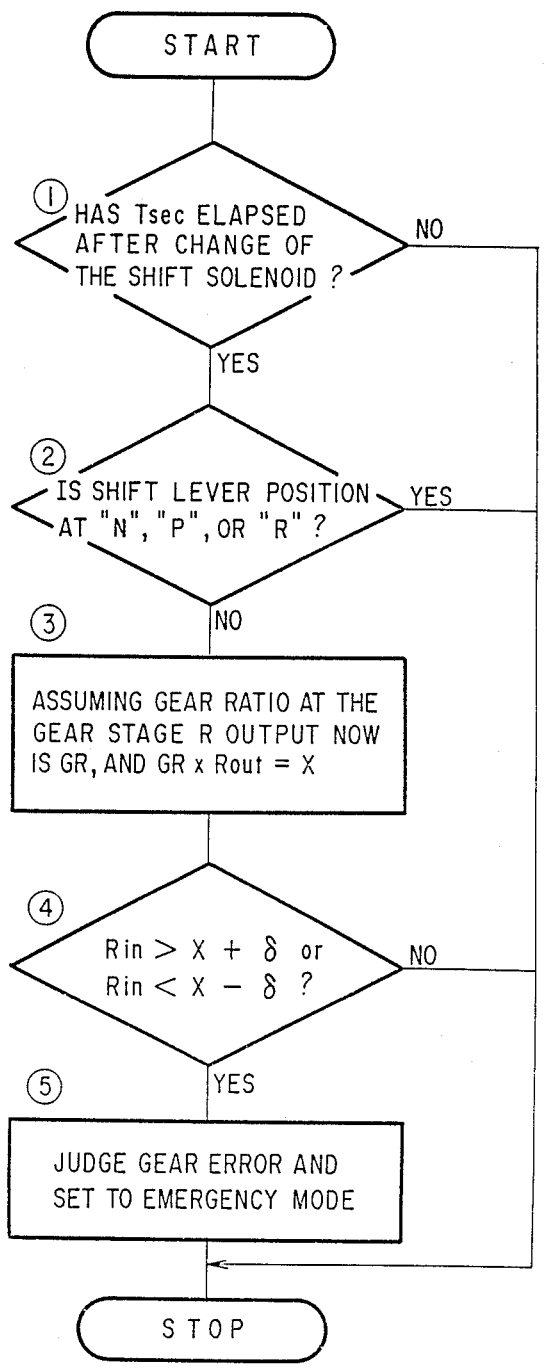
FIG. 3 is a flow chart illustrating an rotation of the fail-safe control system of an electronically controlled automatic transmission according to the present invention.

Operation of the fail-safe control system in the electronically controlled automatic transmission will be described in detail with reference to FIG. 3.

First, it is determined if a predetermined time Tsec has been elapsed or not after the change operation of the shift solenoid (step ①), wherein the predetermined time Tsec represents a sufficient time (3 to 5 seconds) for completion of the actual transmission shift after the change operation of the shift solenoid.

Next, if the predetermined time Tsec has elapsed, it is determined whether the shift lever position if at N (neutral), P (parking), or R (reverse) (step ②).

Then, in a case whether the shift lever position is not at any of the N (neutral), P (parking), or R (reverse), the gear ratio of the present gear stage R is made GR (step ③), wherein it is expressed by $GR \times Rout = X$, and Rout represents the number of revolution output from the T/M.

Next, it is determined whether $Rin > X + \delta$ or $Rin < X - \delta$ (step ④), wherein $\delta$ represents a constant for preventing erroneous detection, and it may be either an absolute value or the ratio with respect to X, and Rin represents the number of revolutions input to the T/M.

In a case where $Rin > X + \delta$ or $Rin < X - \delta$, it is determined that a gear error occurs so that the emergency mode is realized (step ⑤).

In this state, the emergency mode is a mode (1) in which manual shifting with the shift lever can be performed, and a mode (2) in which the hydraulic pressure for the transmission is set to the maximum level (safety region). In this failure state the failure communicated to the driver.

By means of the structure described above, failures in the mechanical portion of an automatic transmission, such as a stick shift valve, a stick of the plunger in the shift solenoid, and the slippage of the friction material due to the reduction in the hydraulic pressure or the like can be properly detected so as to notify the driver. Furthermore a reliable fail-safe control can be performed.

The present invention is not limited to the above-described embodiment; other various modifications based on the spirit of the present invention are possible and they are not excluded from the scope of the present invention.

What is claimed is:

1. A fail-safe control device for an electronically controlled automatic transmission including at least one shift solenoid for effecting gear changes and a mechanical portion, said shift solenoid operating responsive to a shift command based on the degree of throttle opening and the speed of the transmission output, said device comprising:

(a) a sensor for detecting the number of revolutions input to said transmission;

(b) a sensor for detecting the number of revolutions output from said transmission or a car speed sensor;

(c) means for calculating an actual gear ratio in accordance with said detected number of input revolutions and said number of detected output revolutions;

(d) means for obtaining a formal gear ratio responsive to shift lever position;

(e) comparison means for determining a failure in the mechanical portion of said transmission by making a comparison between said formal gear ratio and the thus-calculated gear ratio; and (f) timing means for preventing said determination of failure for a predetermined period of time beginning with a change of the shift solenoid and ending after a new gear stage responsive to said change is stabilized.

2. A fail-safe control device for an electronically controlled automatic transmission according to claim 1, wherein said sensor for the number of revolutions input to said transmission is designed to detect the number of revolutions of a $C_1$ drum of a transverse engined FF vehicle.

3. A fail-safe control device for an electronically controlled automatic transmission according to claim 1, further comprising a failure alarm device responsive to said failure determination.

4. A fail-safe control device for an electronically controlled automatic transmission according to claim 1, wherein said failure in the mechanical portion is slippage of the friction elements in the automatic transmission.

5. A fail-safe control method for an electronically controlled automatic transmission including a memory, at least one shift solenoid for effecting gear changes and a mechanical portion, said method comprising:
 (a) measuring the number of revolutions input to said transmission Rin from a sensor for Rin;
 (b) measuring the number of revolutions output Rout from said transmission using a sensor for Rout or a car speed sensor;
 (c) calculating an actual gear ratio in accordance with Rin and Rout or said car speed and storing said calculated actual gear ratio in the memory;
 (d) detecting shift lever position and determining the formal gear ratio based on the detected shift lever position;
 (e) inputting the formal gear ratio into said memory;
 (f) compraring said formal gear ratio and the thus-calculated gear ratio; and
 (g) counting a predetermined lapse of time subsequent to change of the shift solenoid, a new stage becoming stabilized during said predetermined lapse of time;
 (h) determining a failure in the mechanical portion of said transmission if the formal gear ratio and the calculated gear ratio do not coincide after lapse of said predetermined time.

6. The method of claim 5 further comprising sounding an alarm responsive to determination of a failure in the mechanical portion of said transmission.

7. The method of claim 5 further comprising (h) determining if the transmission is in neutral, park or reverse and, if not in neutral, park or reverse, determining if one of the following conditions is met:

$$Rin > X + \delta$$

$$Rin < X - \delta$$

wherein X is the gear ratio GR X Rout and $\delta$ is a constant for preventing erroneous detection of failure; and
 (i) converting operation of the transmission to an emergency mode if one of said conditions is satisfied and a failure is determined.

* * * * *

UNITED STATES PATENT AND TRADEMARK OFFICE
CERTIFICATE OF CORRECTION

PATENT NO. : 4,955,258

DATED : September 11, 1990

INVENTOR(S) : ITO et al

It is certified that error appears in the above-identified patent and that said Letters Patent is hereby corrected as shown below:

TITLE PAGE,
IN THE ABSTRACT:

Line 15, "exmple" should read --example--.

Col. 1, line 19, delete "is controlled"; and line 65, "calculted" should read --calculated--.

Col. 2, line 5, "stick", both instances, should read --stuck--.

Col. 3, line 4, delete "for the number of revolution output from" and insert a comma --,--;

line 7, delete "conincides" and insert --coincides--;

line 35, after "of" insert --revolutions--; and line 51, "under drive" should read --under-drive--.

Col. 4, line 8, delete "if" and insert --is--;

line 32, "stick", both instances, should read --stuck--;

line 32, delete "of the".

UNITED STATES PATENT AND TRADEMARK OFFICE
CERTIFICATE OF CORRECTION

PATENT NO.  : 4,955,258

DATED       : September 11, 1990

INVENTOR(S) : ITO et al.

It is certified that error appears in the above-identified patent and that said Letters Patent is hereby corrected as shown below:

Col. 6, line 8, after "new" insert --gear--.

Signed and Sealed this

Third Day of March, 1992

Attest:

HARRY F. MANBECK, JR.

Attesting Officer

Commissioner of Patents and Trademarks